J. VILA y JOVÉ.
Duplex Whistle for Steam-Boilers.
No. 227,539. Patented May 11, 1880.
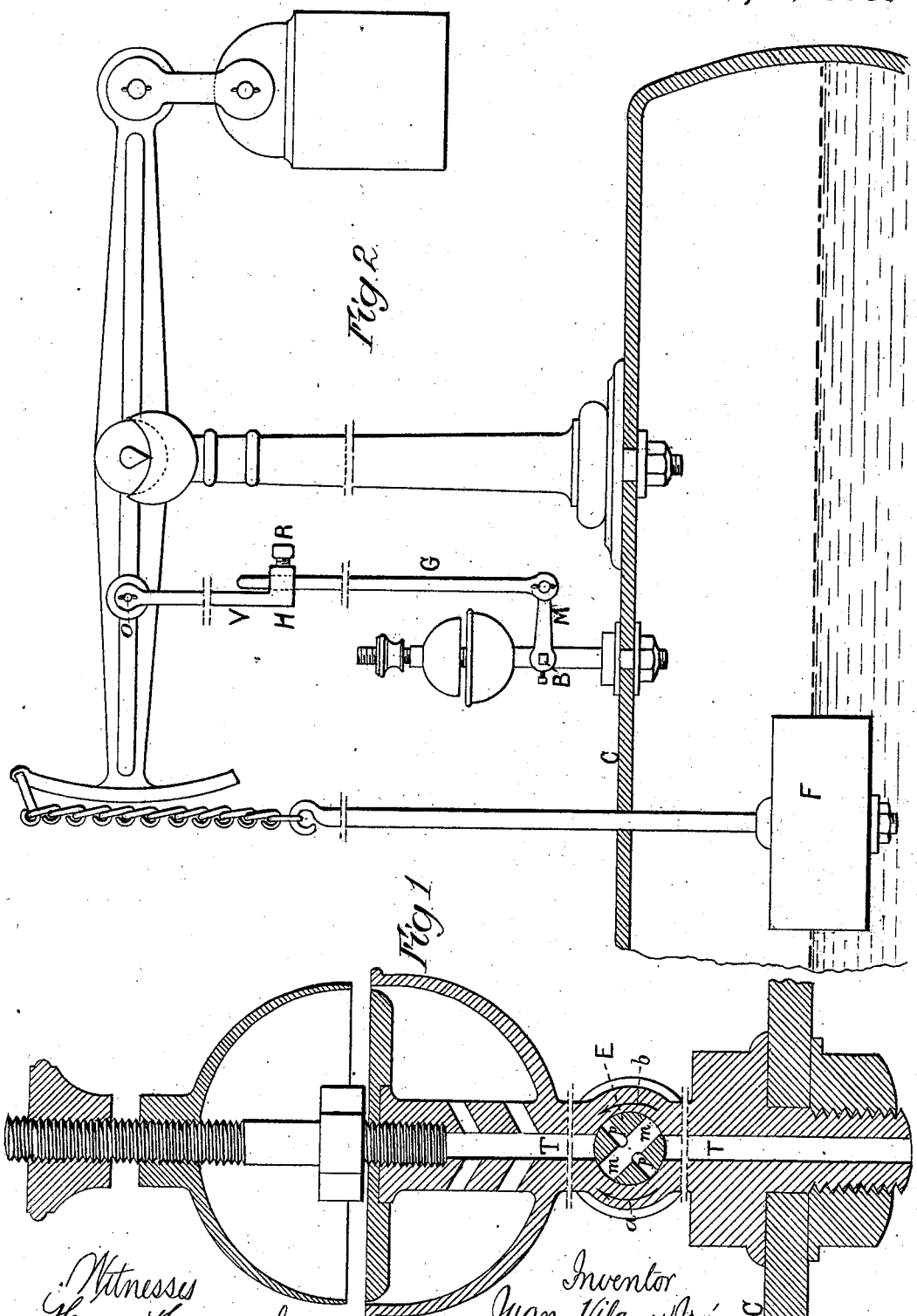

UNITED STATES PATENT OFFICE.

JUAN VILA Y JOVÉ, OF BARCELONA, SPAIN.

DUPLEX WHISTLE FOR STEAM-BOILERS.

SPECIFICATION forming part of Letters Patent No. 227,539, dated May 11, 1880.

Application filed May 5, 1879.

*To all whom it may concern:*

Be it known that I, JUAN VILA Y JOVÉ, of Barcelona, Spain, have invented certain Improvements in Automatic Alarms for Steam-Boilers, of which the following is a specification.

My invention consists of an automatic alarm for giving notice of any diminution or excess of water in a boiler, the alarm being arranged on the upper part of the boiler, so that its movements may be controlled by a balance-lever which is raised by a stone float. The alarm is so arranged that it will be silent when the water is at or about a proper level; that the whistle will commence to blow lightly when the water rises above this level, and that the loudness of the whistle will increase continuously in proportion as the level of the water becomes lower and until the water reaches its proper level.

Figure 1 of the annexed drawings shows a sectional view, partly in elevation, of a whistle such as is used on locomotives, E being the cock adapted to the tube T, which communicates with the steam-boiler C.

It will be seen that the cock E is a two-way cock, the ways being at right angles to each other and the way $m$ larger than the way $p$. When in the position indicated in the drawings the whistle is silent, because none of the openings in the cock communicate with the central tube, T.

On the end B of the cock is secured the arm M, pivoted at its end to the rod G, which is in turn secured to a rod, V, connected to the balance-lever by a pin, $o$, Fig. 2. It will be readily understood that with this arrangement, when there is a deficiency of water in the boiler the float F will descend, and with it the rods V G, and that the cock E will be turned in the direction indicated by the arrow $a$, so as to put the way $m$ in communication with the central opening, T. A low-water alarm will consequently be given, the loudness being determined by the quantity of steam passing through T and $m$.

When there is an excess of water in the boiler there will be a reverse movement, the cock of the alarm turning in the direction indicated by the arrow $b$, and the small way $p$ being brought in line with the tube T, and a more moderate sound, indicating an excess of water, will be produced.

Fig. 2 represents a complete apparatus not in action.

The main feature of the invention consists in the combination of two ways, $m$ and $p$, in the cock of the alarm, the ways being arranged at right angles to each other and so that while the descent of the float F will put the larger way $m$ in communication with the tube T of the alarm, its ascent causes the small way $p$ to communicate with the same tube, thus producing different whistles, one being a low-water signal and the other a signal indicating an excess of water.

The proper position for the cock E is regulated by the compound construction of the rods V G. At the lower end of the rod V is a square socket, H, for receiving the rod G, which is retained at the required point by a set-screw, R.

I claim as my invention—

The combination of a whistle having a cock with two ways, of different sizes, with a float and with mechanism, substantially as described, for causing the float to operate the said cock.

In testimony whereof I have signed my name to this specification in the presence of two subscribing witnesses.

JUAN VILA Y JOVÉ.

Witnesses:
 CRISTOBAL BAS Y VALLÉS,
 JOSÉ RURA Y RIBÓ.